United States Patent
Lechevallier

[11] 3,904,345
[45] Sept. 9, 1975

[54] CUPPING MACHINE FOR PRODUCING CONTAINERS IN THERMOPLASTIC FILM AND COMPRISING A DEVICE FOR PLACING A TAPE-LIKE STRIP IN A MOLD

[75] Inventor: Raymond Lechevallier, Potigny, France

[73] Assignee: Ste. d'Application Plastique Mecanique et Electronique Plastimecanique, Courbevoie, France

[22] Filed: Nov. 12, 1973

[21] Appl. No.: 414,716

[30] Foreign Application Priority Data
Nov. 11, 1972 Germany............................ 2255442

[52] U.S. Cl. ............... 425/501; 425/122; 425/510; 425/518; 425/521; 264/280; 156/510; 425/324 R
[51] Int. Cl.² ..................... B29D 9/00; B32B 31/04
[58] Field of Search ........... 425/324, 383, 518, 510, 425/122, 512, 308, 521, 501; 83/408, 926; 264/160, 250, 280; 156/510

[56] References Cited
UNITED STATES PATENTS
3,318,985  5/1967  Turner et al. .................. 425/116 X
3,453,162  7/1969  Turner ........................... 425/504 X
3,709,643  1/1973  Nasica ........................... 425/324 X

*Primary Examiner*—Robert L. Spicer, Jr.
*Attorney, Agent, or Firm*—Parmelee, Miller, Welsh & Kratz

[57] ABSTRACT

The present invention concerns a cupping machine for producing containers in thermoplastic film and comprising a device for placing a tape-like strip in a mould, in the frame of which machine are disposed a holder for a roll of thermoplastic film, means for moving this film, a heating device and a shaping apparatus which comprises at least one row of moulds, which are displaceable at right angles to the plane of the film, extend over the entire width of the film and, after the film has been heated, are pressed towards a male half having first-stage shaping mandrels and disposed on the other side of the film, the containers being finally formed by means of a pressure medium and, at the same time, the tape-like strips, brought into the moulds, being sealed onto the containers.

6 Claims, 2 Drawing Figures

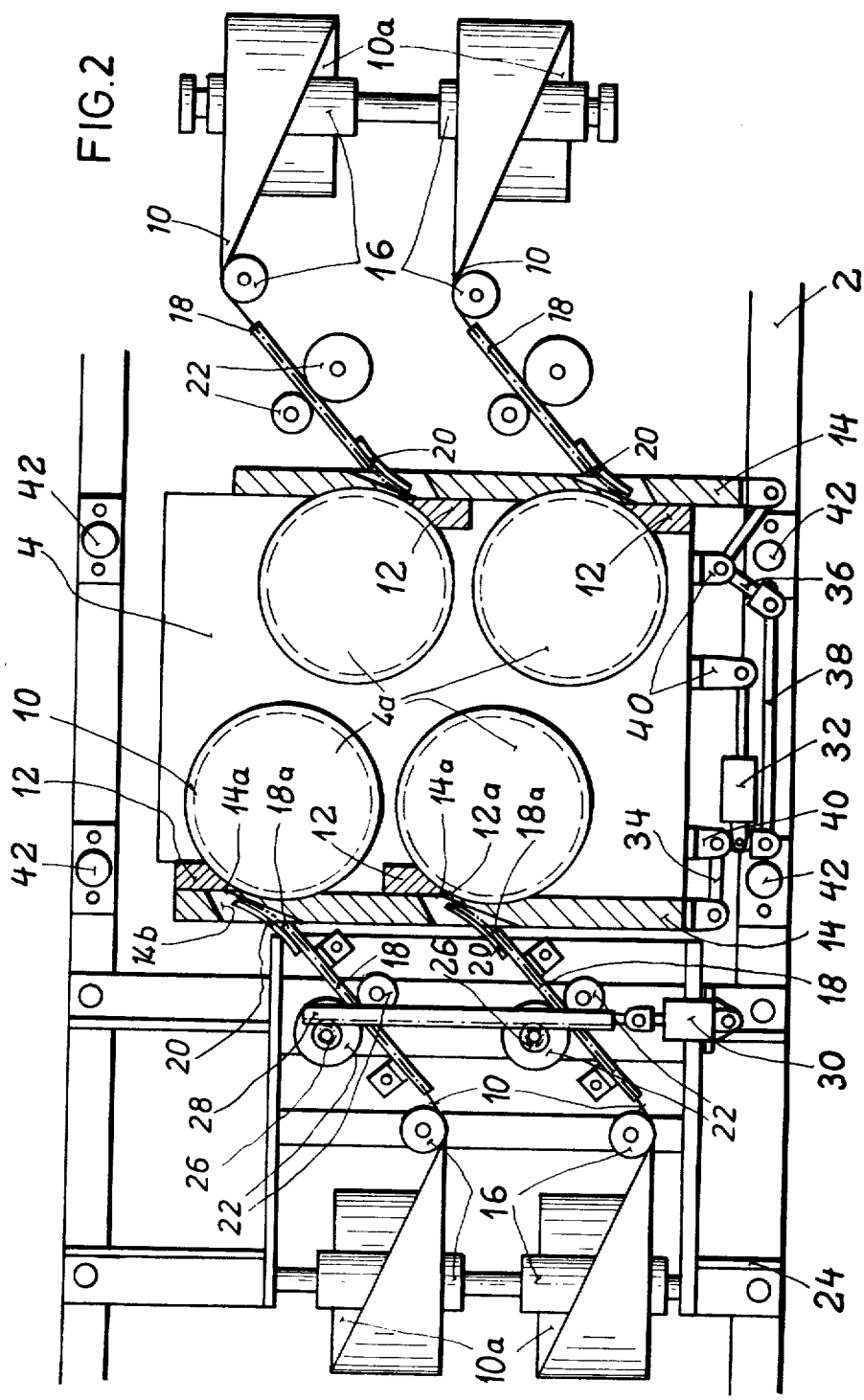

CUPPING MACHINE FOR PRODUCING CONTAINERS IN THERMOPLASTIC FILM AND COMPRISING A DEVICE FOR PLACING A TAPE-LIKE STRIP IN A MOLD

BACKGROUND OF THE INVENTION

Containers made of thermoplastic film are used for the packaging of foods or pharmaceutical products, and tape-like strips are intended, on the one hand, to reinforce the walls of the containers and, on the other, to enable decorative or written matter to be applied in a simple manner to the side walls of the containers. The tape-like strips may be of any required type and may be made for example of cardboard, thermoplastic material, aluminum, etc. On that face to be applied to the side wall of the container, each strip has an adhesive which can be activated by heat and which holds the strip firmly on the side wall of the container made from thermoplastic film.

The production of such containers with reinforced walls has been known in principle for many years. Basically, the method consists of placing the tape-like reinforcing strip in a mould, laying a previously heated thermoplastic film over the open side of the mould, initially forming a container with the aid of a ram which, as it enters the mould, deforms the thermoplastic film, and using a pressure medium for completing the shaping of the container, which pressure medium is applied to the pre-shaped container from the ram side and presses it against the inner wall of the mould, the film constituting the container thereby adhering firmly to the tape-like reinforcing strip previously placed in the mould.

It will be appreciated that, in view of the present day high ejection rates of cupping machines, there is no question of placing the tape-like strip in the moulds by hand and that only automatic insertion of the strip into the moulds can lead to sufficiently low costs for producing such containers to make the advantages that they have over containers produced by normal methods worth considering.

Various proposals on the design of such automatic devices for inserting the tape have been put forward, but the known devices suffer from the disadvantage that they are complicated in construction and reduce the workrate of the cupping machine to a rather great extent. This is attributable to the fact that in the known devices the tape-like strips are initially brought into a first-stage mould and the final mould has to be so aligned with the first-stage mould that the tape-like strip can be pushed into the final mould by means of a ram. With the known devices it is thus necessary to provide ways and means for achieving such aligment. In accordance with one proposal, this is done by tilting the final mould through 90° and thus aligning it accurately with the first-stage mould. In this system, it is therefore necessary to provide not only a first-stage mould and an insertion ram together with the associated mechanism, but also means for tilting the final mould, which tilting operation, although causing no difficulties in the case of small moulds, does however lead to considerable difficulties with larger moulds, particularly if these are arranged side-by-side in several rows, the problem involved not only being that of a more complicated system but the basic one of finding space for accommodating it.

In another known form of device for inserting a tape-like strip in a mould, the first-stage mould and the insertion ram together with the associated mechanism are disposed laterally of the web of film material, and the final moulds, which are disposed below the web of film material for the purpose of shaping the containers, are moved laterally away from the zone through which the web passes and are brought into alignment below the first-stage mould, for the purpose of inserting the tape-like strip. The disadvantages of this known arrangement are similar to those of the above-mentioned system, since here again a very costly and complicated construction must be used in order to bring the strip into the mould, and the need for aligning the final moulds with the first-stage moulds results in a reduction in the ejection rate of the cupping machine.

THE INVENTION

The object of the present invention is to avoid these disadvantages and to provide a cupping machine for producing containers made of thermoplastic film, which machine has a device for inserting a tape-like strip into a mould, and is simple in construction while capable of operation at parctically the same ejection rate as a cupping machine having no strip-like inserting device.

According to the invention, this object is achieved by providing device for passing the tape-like strips directly into the moulds without the interposition of first-stage moulds and insertion rams, this preferably being achieved by providing each mould with a closable tangential slot through which the tape-like strip is pushed into the mould by a feed unit in such manner that the strip lies against the inner wall of the mould.

The form of the device of the invention for inserting the tape-like strip into the moulds results in a very simple design of cupping machine, since it is not necessary to provide first-stage moulds, insertion rams and the associated mechanism, nor do the final moulds have to be aligned with first-stage moulds. The moulds, which are arranged in a support, complete the shaping of the containers in the film when for example the mould support is in its upper position, while in the lower position of the support the moulds are fed with the tape-like strips, without the need for any additional movement of the mould support, e.g. a tilting movement, a lateral displacement or simply a longer downward stroke.

In a particularly advantageous embodiment of the invention, the closable tangential slot is formed by the two cutting edges of a shearing tool, displaceable substantially tangentially of the mould, when this tool is opened. In this arrangement, the moulds forming a row each have a tangetial slot extending through the mould-wall in the same direction as the slots in the other moulds, and the fixed blade of the shearing tool associated with each mould forms part of the mould, whereas the movable blades of the shearing tool are combined in a flat bar displaceable tangentially of the moulds and containing openings, one substantially vertical edge of which in each case forms the cutting edge, and that face of the flat bar that is presented to the moulds is machine out so that when the shearing tool is closed the contour of each mould is completed.

The use of the two cutting edges of a shearing tool for the purpose of forming the closable tangential slots as proposed by the invention results in a particularly compact form of machine, and this is of considerable importance since it enables the containers to be formed in very closely spaced portions of the film, so that only small quantities of scrap occur when stamping out the containers.

In accordance with a further feature of the invention, the unit for feeding the tape-like strips is positioned below the film on the machine stand, and the moulds which are movable at right-angles to the plane of the film and which, in their upper position, press the film against the male half to form the containers, are located, in their lower position, at the same height as the feed unit for introducing the tape-like strip into the moulds. The tape-like strip is introduced into each of the moulds by drawing it off a supply roll and introducing it with the aid of guide rollers into a guide channel, the outlet end of which is disposed in the immediate proximity of an opening in the displaceable flat bar forming part of the shearing tool, a resilient tongue being fitted at the outlet end of each of the guide channels for the purpose of directing the tape-like strip through the tangential slot in each of the moulds, and there being provided feed rollers which extend into the guide channels and rotate in synchronism with the stroke of the machine. For this purpose the feed unit can be arranged on a stand or base plate which is displaceably mounted below the film on guide rails in such manner that, when the mould stand is in its lower position, the guide channels can be moved into and withdrawn from the slots formed by the severing devices.

DESCRIPTION OF THE DRAWINGS

The invention will now be described by reference to the embodiment illustrated in the annexed drawings, in which:

FIG. 2 is a plan view, partly in section, of the cupping machine shown in FIG. 1.

Figure 1:
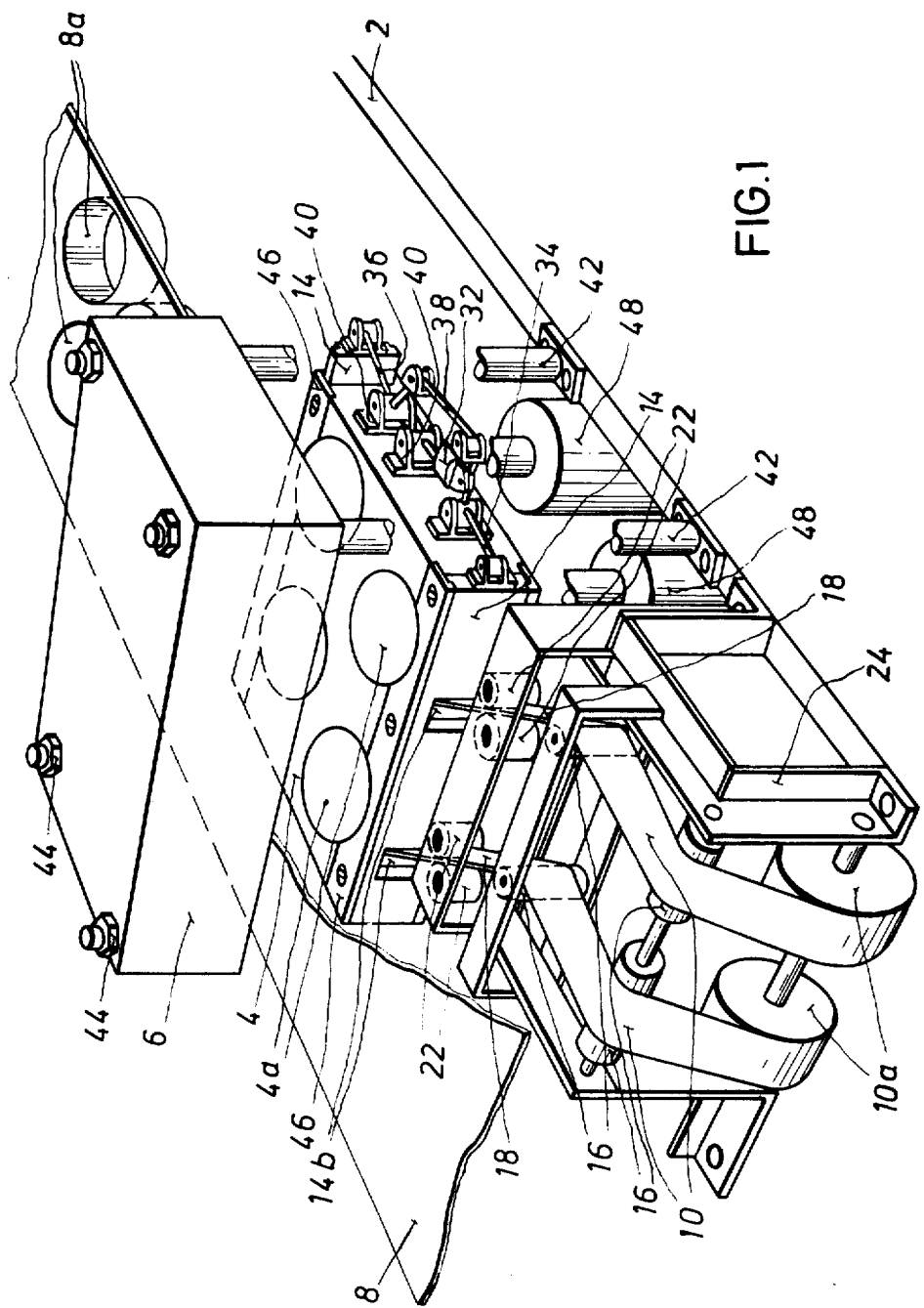
FIG. 1 is a perspective view of an embodiment of a cupping machine equipped with the apparatus of the invention.

The only parts of the machine frame 2 shown in the drawings are the upper edges on which the various devices are mounted, and the only parts of the cupping machine that are illustrated are those of importance to the apparatus of the invention for inserting a tape-like strip into a mould. Thus, the drawing omits all those devices and mechanisms of the machine that are positioned upstream or downstream of the mould support, e.g. the stand for a roll of thermoplastic film, the means for feeding this film, the heating device and the units disposed downstream of the mould support, e.g. the filling apparatus, the capping or sealing mechanism and the blanking tools, since all of these items of equipment associated with cupping machines are well known and have no direct connection with the design of the apparatus of the invention for inserting a tape-like strip in a mould.

DESCRIPTION OF THE PREFERRED EMBODIMENTS

As will be seen, the male half 6 of the shaping unit is positioned above the thermoplastic film 8 and is carried on columns 42 screwed into the bed 2 of the machine, the male half being secured to these columns 42 with the aid of the nuts 44. The mould support or female mold 4 is positioned below the thermoplastic film 8 and, by means of the hydraulic or pneumatic piston-and-cylinder unit 48 can be raised and lowered and in the raised position caused to press the male half 6 against the thermoplastic film 8, whereafter the containers 8a are formed in the moulds 4a. When the mould support 4 is lowered into the position illustrated, while the film 8 remains in the illustrated plane with the containers 8a that have just been formed still attached to the web of material, the containers 8a are removed from the moulds, so that the film 8 can be moved another step forward. In its lower position, as illustrated, the mould support 4 is positioned at the same level as the apparatus for inserting a tape-like strip into a mould, which apparatus, in the example illustrated, consists of a frame 24 which is secured to the upper edges of the machine frame 2 and in which the supply rolls 10a of type-like strip 10 are mounted, as well as the guide rollers 16, the feed rollers 22 and the guide channels 18. The drive for the feed rollers 22 has not been shown in FIG. 1, in order to make this Figure easier to read. As seen from FIG. 2, this drive consists of a rack 28, which meshes with pinions 26 mounted on the spindles of the feed rollers 22, and which is reciprocated in synchronism with the stroke of the machine by a hydraulic or pneumatic piston-and-cylinder unit 30. The pinions 26 are connected through a slip coupling, not illustrated, to the spindles of the feed rollers 22, so that the latter only turn and draw a predetermined length of tape-like strip 10 from the supply roll 10a each time the rack 28 moves forward. As can be seen, the tape-like strips 10 are twisted, by means of the guide rollers 16, from a horizontal into a vertical plane and then passed into the guide channels 18 into which extend the above-mentioned feed rollers 22. The outlet ends 18a of the guide channels 18 are disposed in the immediate proximity of the openings 14b in the flat bars 14 and are provided with resilient tongues 20 which are intended to ensure that the tape-like strips 10, emerging from the outlet ends 18a of the guide channels 18, are guided firmly into the mould 4a.

The tape-like strips pass into the moulds 4a through the openings 14b in the flat bars 14 when the latter are retracted to such extent that tangential slots are formed between the fixed blades 12 having fixed cutting edges 12a and the movable cutting edges 14a of the flat bars 14. The flat bars 14 are held and guided on the lateral faces of the mould support 4 by means of the sheet-metal angles 46, and at the same time form, in the closed position illustrated, part of the contour of the moulds 4a. The fixed blades 12, which are replaceable, are detachably secured in recesses in the lateral faces of the mould support 4 and these blades likewise form part of the contour of the moulds 4a. The flat bars 14 are moved by a hydraulic or pneumatic piston-and-cylinder unit 32, the piston rod of which is coupled to a bearing block 40, whereas the cylinder engages a toggle lever 34 which is coupled at one end to the flat bar 14 and is connected at the other end, by way of a connecting rod 38, to a further toggle lever 36 which therefore simultaneously drives the flat bar 14 disposed at the other lateral face of the mould support 4.

In the example illustrated, four molds 4a are provided in the mould support 4, and two of the moulds are supplied with tape-like strip at one side of the mould support 4 and the other two are supplied at the other side of the mould support, so that a device for feeding the strip 10 must be fitted at both sides of the mould support. In order not to overload the drawing, the second feed device is omitted entirely from FIG. 1, and is illustrated only in a rough manner in FIG. 2. It should, however, be mentioned that only one feed device is necessary for the tape-like strip when only one row of moulds 4a is provided in the mould support 4. Furthermore, it is not necessary for the feed device to be positioned upstream or downstream of the mould support 4; instead it can be fitted at a position in which it is turned through 90° from the device as shown in the illustrated example, i.e. is at right angles to the unit for advancing the film. Finally, it should also be stated that the number of moulds 4a forming a row is determined by the width of the cupping machine, i.e. 10 or more moulds can be arranged in a row, in which case corresponding feed means for the tape-like strip must, of course, be provided for each of these moulds.

The mode of operation of the device is as follows: each time the shaping of the containers 8a in the film 8 is completed and the mould support or female mold 4 is moved into its lower position by means of the hydraulic or pneumatic piston-and-cylinder unit 48, the hydraulic or pneumatic piston-and-cylinder unit 32 is actuated by the machine-operating means in such a manner that the flat bars 14 are displaced and slots are formed between, on the one hand the knife-edges 12a of the fixed blades 12 and on the other the knife-edges 14a of the flat bars 14. Thereafter the hydraulic or pneumatic piston-and-cylinder unit 32 is actuated by the machine-operating means so that the feed rollers 22 are caused to rotate with the aid of the rack 28 and the pinions 26, and a length of tape-like strip 10, corresponding to the circumference of the moulds 4a is inserted into each of these moulds. The strips 10 are guided through the guide channels 18, and after emerging therefrom they are guided by means of the resilient tongues 20 in such a way that they move past the knife-edges 12 a of the fixed blades 12 and into the moulds 4a. Thereafter the hydraulic or pneumatic piston-and-cylinder units 32 is actuated again, so that the flat bars 14 move back into the position illustrated, and the tape-like strip is severed by means of the knifeedges 12a and 14a. At the same time, the hydraulic or pneumatic piston-and-cylinder unit 30 returns to its initial position, without the feed rollers 22 pushing the tape-like strip 10 back again, since this is prevented by means of the slip couplings provided in the pinions 26. The moulds 4a will now have received lengths of strip 10, and the mould support 4 is raised by the hydraulic or pneumatic piston-and-cylinder unit 48 and is pressed against the heated film 8, so that further containers 8a can be formed in the moulds 4a, the tape-like strips which lie against the inner walls of the moulds being sealed onto the containers.

As can be seen from the description and drawings, the only change that has to be made to the mould support 4, as compared with that of an existing cupping machine which operates without apparatus for inserting a tape-like strip into the moulds, is that involved in providing the displaceable flat bars 14 and 14' and the fixed blades 12 and 12' on the mould support 4, plus the associated actuating devices. Furthermore, there must be provided for each row of moulds means for feeding the tape-like strips together with a corresponding number of elements for guiding and advancing the strip. The guide means can, however, be positioned in the unoccupied space upstream or downstream of the mould support or at the side thereof, so that no additional space is required for them. It is, therefore, easily possible to convert existing cupping machines into machines in accordance with the invention and having an apparatus for inserting a tape-like strip. Since there is no need for any alteration as regards the upward and downward movement of the mould support 4, i.e. it does not require to be tilted or moved laterally out of the cupping machine in order to introduce the strips into the moulds, it will be clear that the apparatus in accordance with the invention causes the ejection rate of the machine to be reduced only slightly, if at all.

The invention is not limited to the example illustrated in which the tape-like strip is fed into the moulds 4a through tangential slots. Particularly in the case of relatively shallow containers, it may be of advantage to introduce the strips directly into the moulds 4a in an inclined downward direction, so that complication of the mould support 4 by the fitting of the movable flat bars 14 and the fixed blades 12 is avoided.

All the details and features disclosed herein, particularly the spatial arrangement and construction of the apparatus, are claimed as being important to the invention so far as, sinly or in combination, they do not form part of the prior art.

I claim:

1. A cupping machine for producing containers in heated thermoplastic film with tape-like strips sealed to the side walls thereof, said machine comprising a mould including a female half and a male half disposed on opposite sides of said heated thermoplastic film, means for displacing said female mould half along a path substatially transverse to the plane of the thermoplastic film between a first position wherein the female mould half is separated from the male mould half and a second position wherein the two mould halves are brought together to mould a cup-like container in the heated thermoplastic film disposed therebetween, said displacing means maintaining said mould halves in axial alignment throughout the relative movement thereof, and means for inserting a tape-like strip into said female mould half while the latter is in said first position to form a loop directly in said female mould half which is axially aligned with both halves of said mould and which is sealed onto the side walls of the container formed in the thermoplastic film as said female mould half is moved by the displacing means to said second position.

2. A cupping machine according to claim 1 including a plurality of moulds each comprising a male mould half and a female mould half disposed on opposite sides of said heated thermoplastic film and wherein said displacing means displaces each of said female mould halves along a path substantially transverse to the plane of the heated thermoplastic film between respective first and second positions while maintaining the associated mould halves in axial alignment throughout the relative movement thereof and wherein the tape-like strip inserting means includes means for inserting a tape-like strip directly into each female mould half while the latter is in its respective first position to form a loop therein which is axially aligned with both associated mould halves and which is sealed to the side walls of the container formed by the associated mould halves as the respective female mould half is moved to the second position by the displacing means.

3. A cupping machine according to claim 2, wherein said tape-like strip inserting means includes for each female mould half means forming a closable slot tangent to the adjacent inner side wall of the female mould half and a feed unit for pushing the tape-like strip through the associated closable slot and along the inner wall of the female mould half.

4. A cupping machine according to claim 3, wherein the means forming the closable slot in each female mould half comprises the cutting edges of the two halves of a shearing tool and means for separating the cutting edges to open the slot and for moving the cutting edges toward each other to simultaneously close said slot and sever the tape-like strip.

5. A cupping machine according to claim 4, wherein the moulds form a row with the closable slot in each female mould half extending through the mould-wall in the same direction as the slots in the other moulds, and wherein one half of the shearing tool associated with each mould forms part of the associated frmale mould half, whereas the other halves of the shearing tools are combined in a flat bar displaceable tangentially of the moulds and containing openings adjacent each mould, one substantially transverse edge of which in each case forms the cutting edge, and that face of the flat bar that is presented to the moulds is machined out so that when the shearing tool is closed the contour of each mould is completed.

6. A cupping machine according to claim 5, wherein at least one feed unit includes a supply roll from which the associated tape-like strip is drawn, a guide channel, for receiving the tape-like strip the outlet end of which is in the immediate proximity of the associated opening in the displaceable flat bar at least when the associated female mould half is in said first position; a resilient tongue for directing the tape-like strip from the guide channel through the tangential slot in the associated female mould half is fitted at the outlet end of the guide channel; and feed rollers, which rotate to feed the tape-like strip through the guide channel into the open slot in the associated female mould half when the latter is in said first position.

* * * * *